(12) United States Patent
Iyer et al.

(10) Patent No.: US 11,586,853 B2
(45) Date of Patent: Feb. 21, 2023

(54) SYSTEM AND METHOD OF VALIDATING MULTI-VENDOR INTERNET-OF-THINGS (IOT) DEVICES USING REINFORCEMENT LEARNING

(71) Applicant: Wipro Limited, Bangalore (IN)

(72) Inventors: Manjunath Ramachandra Iyer, Bangalore (IN); Chandrashekar Bangalore Nagaraj, Bangalore (IN); Shashidhar Soppin, Bangalore (IN)

(73) Assignee: Wipro Limited, Bangalore (IN)

( * ) Notice: Subject to any disclaimer, the term of this patent is extended or adjusted under 35 U.S.C. 154(b) by 394 days.

(21) Appl. No.: 16/835,000

(22) Filed: Mar. 30, 2020

(65) Prior Publication Data

US 2021/0256318 A1 Aug. 19, 2021

(30) Foreign Application Priority Data

Feb. 17, 2020 (IN) .............................. 202041006809

(51) Int. Cl.
*G06K 9/62* (2022.01)
*G16Y 20/20* (2020.01)
(Continued)

(52) U.S. Cl.
CPC ......... *G06K 9/6264* (2013.01); *G06K 9/6215* (2013.01); *G06N 3/049* (2013.01);
(Continued)

(58) Field of Classification Search
CPC .. G06K 9/6264; G06K 9/6215; G06K 9/6276; G06K 9/6272; G06N 3/0445;
(Continued)

(56) References Cited

U.S. PATENT DOCUMENTS 9,753,796 B2 9/2017 Mahaffey et al.
2016/0105305 A1 4/2016 Pignatora et al.
(Continued)

FOREIGN PATENT DOCUMENTS

WO 2019099111 A1 5/2019

OTHER PUBLICATIONS

What is reinforcement learning, Osinski et al, 2018; https://deepsense.ai/what-is-reinforcement-learning-the-complete-guide/ (Year: 2018).*

*Primary Examiner* — Jianxun Yang
(74) *Attorney, Agent, or Firm* — Finnegan, Henderson, Farabow, Garrett & Dunner, LLP

(57) ABSTRACT

The disclosure relates to a system and method of configuring and validating multi-vendor and multi-region Internet-of-Things (IoT) devices using reinforcement learning. In some embodiments, the method includes generating a matching table for each of a plurality of IoT sensors based on a plurality of sensor attributes extracted from a product data associated with an IoT sensor; acquiring an identification information and operational information associated with the IoT sensor and a set of neighboring IoT sensors for each of the plurality of IoT sensors; identifying an appropriate set of IoT sensors from the plurality of IoT sensors, based on a user requirement, the matching table, the identification information and the operational information, using a Reinforcement Learning (RL) model; and dynamically configuring each of the appropriate set of IoT sensors based on a vendor type.

13 Claims, 4 Drawing Sheets

(51) Int. Cl.
  *G06N 3/04*      (2006.01)
  *G16Y 10/45*     (2020.01)
  *G16Y 30/00*     (2020.01)
  *G06N 3/049*     (2023.01)

(52) U.S. Cl.
  CPC ............ *G06N 3/0445* (2013.01); *G16Y 10/45*
    (2020.01); *G16Y 20/20* (2020.01); *G16Y 30/00*
    (2020.01)

(58) Field of Classification Search
  CPC ...... G06N 3/049; G06N 3/006; G06N 3/0454;
      G16Y 10/45; G16Y 20/20; G16Y 30/00;
      G06V 10/454; G06V 10/82
  See application file for complete search history.

(56)          References Cited

U.S. PATENT DOCUMENTS

| | | | |
|---|---|---|---|
| 2019/0138650 A1* | 5/2019 | Snider | G06K 9/6267 |
| 2019/0245713 A1  | 8/2019 | Lo et al. | |
| 2020/0089437 A1* | 3/2020 | Childress | G06F 3/0604 |
| 2021/0056430 A1* | 2/2021 | Wu | G06N 3/0445 |

\* cited by examiner

SYSTEM AND METHOD OF VALIDATING MULTI-VENDOR INTERNET-OF-THINGS (IOT) DEVICES USING REINFORCEMENT LEARNING

TECHNICAL FIELD

The present disclosure relates generally to Internet-of-things, and more particularly to a system and method of configuring and validating multi-vendor and multi-region Internet-of-Things (IoT) devices using reinforcement learning.

BACKGROUND

Today, IoT devices are being used for various applications such as a smart home, a smart energy meter, or a smart manufacturing hub. These IoT based applications are making human lives easier. However, an increasing proliferation of IoT devices in an IoT ecosystem poses a number of challenges. For example, when an output generated by one of the IoT devices is not accurate or not validated properly, then it may result in an undesirable situation. Many a times, even minute variations in the output data of the IoT devices may result in unwanted outcome as the decision is based on the erroneous output data. Consequently, validation of IoT devices is an important aspect for mitigating any undesirable situation.

At times, the IoT devices (also, interchangeably referred to as IoT sensors or IoT sensor devices) generate erroneous data due to un-natural events, particularly when installed outdoor, such as insect covering the IoT sensor device, a leaf or some object covering the IoT device. In such cases, the IoT sensor devices generate wrong outputs for a period of time. Additionally, the IoT devices from different vendors need different kind of validation steps since they are manufactured for different platform, protocol, standards, security and network. The faults and anomaly generated by each of these IoT devices may be reported differently and need to be validated accordingly. Further, the validation steps for sensor devices from same vendor may change based on the region of geography due to regulations, environment and other external factors. Although, various test beds for testing and validating IoT devices for each vendor exist in isolation, they are limited in their scope and utility. For example, many a times, vendors do not validate the IoT sensor devices before deploying. This may cause inconvenience to customers as validation as there is no standard technique to validate multi-vendor and multi-region IoT devices. A concatenation of multiple testbeds at one platform is not practical as it involves a huge set of patterns and databases.

In short, conventional techniques fail to provide for validation of IoT sensor devices for normal and for anomaly. Additionally, conventional techniques fail to provide for an effective and efficient platform for validating a large number of IoT sensor devices, belonging to different vendors and different regions. Further, conventional techniques do not address any type of auto-configuration of the IoT sensor devices across geographies, an anomaly detection while the IoT sensor devices are in working mode, or a selection of multivendor sensor devices based on a user requirement (interoperability)

SUMMARY

In one embodiment, a method for dynamically configuring Internet-of-Things (IoT) sensors using reinforcement learning is disclosed. In one example, the method may include generating a matching table based on a plurality of sensor attributes extracted from a product data associated with an IoT sensor for each of a plurality of IoT sensors. The method may further include acquiring an identification information and an operational information for each of the plurality of IoT sensors associated with the IoT sensor and a set of neighboring IoT sensors. The method may further include identifying an appropriate set of IoT sensors from the plurality of IoT sensors, based on a user requirement, the matching table, the identification information and the operational information, using a Reinforcement Learning (RL) model. It should be noted that the RL model may be trained to determine the appropriate set of IoT sensors by rewarding or penalizing a plurality of sets of IoT sensors based on their respective performance scores. The method may further include dynamically configuring each of the appropriate set of IoT sensors based on a vendor type.

In another embodiment, a system for dynamically configuring Internet-of-Things (IoT) sensors using reinforcement learning is disclosed. In one example, the system may include a processor and a memory communicatively coupled to the processor. The memory may store processor-executable instructions, which, on execution, may causes the processor to generate a matching table for each of a plurality of IoT sensors based on a plurality of sensor attributes extracted from a product data associated with an IoT sensor. The processor-executable instructions, on execution, may further cause the processor to acquire an identification information and an operational information for each of the plurality of IoT sensors associated with the IoT sensor and a set of neighboring IoT sensors. The processor-executable instructions, on execution, may further cause the processor to identify an appropriate set of IoT sensors from the plurality of IoT sensors, based on a user requirement, the matching table, the identification information and the operational information, using a Reinforcement Learning (RL) model. It should be noted that the RL model may be trained to determine the appropriate set of IoT sensors by rewarding or penalizing a plurality of sets of IoT sensors based on their respective performance scores. The processor-executable instructions, on execution, may further cause the processor to dynamically configure each of the appropriate set of IoT sensors based on a vendor type.

In yet another embodiment, a non-transitory computer-readable medium storing computer-executable instruction for dynamically configuring Internet-of-Things (IoT) sensors using reinforcement learning is disclosed. In one example, the stored instructions, when executed by a processor, may cause the processor to perform operations including generating a matching table for each of a plurality of IoT sensors, based on a plurality of sensor attributes extracted from a product data associated with an IoT sensor. The operations may further include acquiring an identification information and an operational information for each of the plurality of IoT sensors associated with the IoT sensor and a set of neighboring IoT sensors. The operations may further include identifying an appropriate set of IoT sensors from the plurality of IoT sensors, based on a user requirement, the matching table, the identification information and the operational information, using a Reinforcement Learning (RL) model. It should be noted that the RL model may be trained to determine the appropriate set of IoT sensors by rewarding or penalizing a plurality of sets of IoT sensors based on their respective performance scores. The operations may further include dynamically configuring each of the appropriate set of IoT sensors based on a vendor type.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
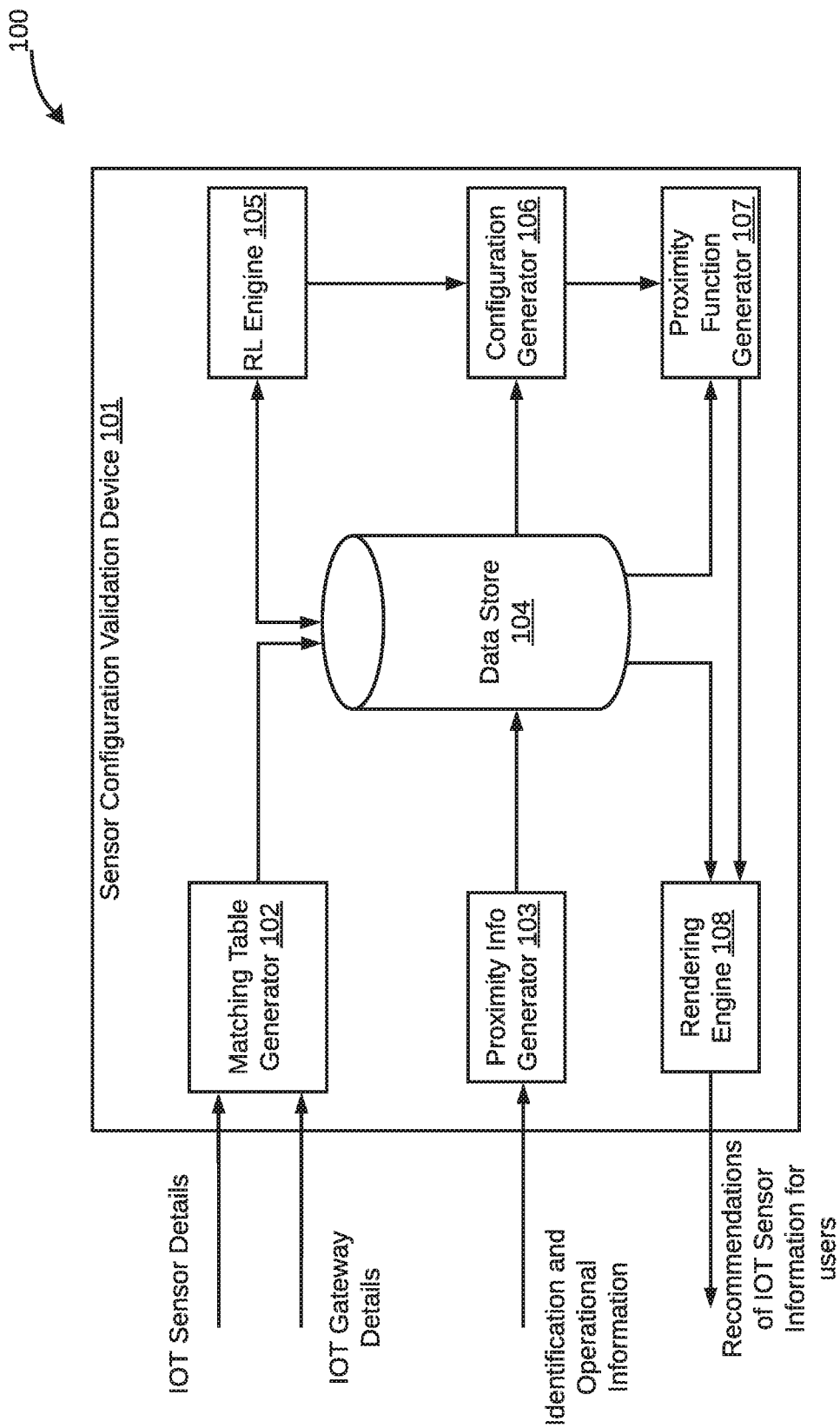
FIG. 1 is a block diagram of an exemplary system for configuring and validating multi-vendor multi-region IoT sensors using reinforcement learning, in accordance with some embodiments of the present disclosure.

Referring now to FIG. 1, an exemplary system 100 for configuring and validating multi-vendor multi-region Internet-of-Things (IoT) sensors using reinforcement learning is illustrated, in accordance with some embodiments of the present disclosure. The system 100 includes a sensor configuration and validation device 101 in order to configure and validate multi-vendor IoT sensors. The sensor configuration and validation device 101 further includes a matching table generator 102, a proximity info generator 103, a data store 104, an RL engine 105, a configuration generator 106, a proximity function generator 107 and a rendering engine 108.

The matching table generator 102 receives IoT sensor details as well as IoT gateway details (say, product data or IoT sensor data) from the system 100 in order to generate a matching table. The IoT sensor details may include a unique ID of an IoT sensor, a gateway-to-sensor IP address, and a server name. Initially, the matching table generator 102 extracts a plurality of sensor attributes from the product data associated with the IoT sensor. The plurality of sensor attributes may comprise at least one of a sensor capability, a sensor usage, and a sensor application. In one example, the matching table generator 102 employs a Universal Plug and Play (UPNP) protocol to extract the plurality of sensor attributes, specifically in terms of capability of the IoT sensor.

In another example, an image of the IoT sensor may be utilized to get the product data. In another example, a web page or a manual associated with the IoT sensor may be used to receive the product data. After receiving the product data, the matching table generator 102 may parse the product data using a Natural Language Processing (NLP) technique to generate the matching table. The matching table generator 102 may be communicatively connected to a data store 104. Further, the generated matching table may be transmitted to the data store 104.

The proximity info generator 103 collects an identification information and an operational information of the IoT sensor and a set of neighboring IoT sensors. The identification information comprises a unique identification number, a vendor identification, or a vendor make information. The operational information comprises a gateway IP address, a physical location, a current state, a voting information, or a working mode. The proximity info generator 103 may be operatively coupled to the data store 104. The identification information and operational information associated with the IoT sensor and the set of neighboring IoT sensors may be further stored into the data store 104 via an interface.

To find a distance between IoT sensors during the identification of an appropriate set of IoT sensors or while shifting a specific IoT sensor to an indicated coordinate for accomplishing a task, the identification information and operational information may be further accessed. The data store 104 stores the identification information, the operational information, and the matching table for further use. Additionally, the data store 104 keeps some intermediate results generated while identifying the appropriate set IoT sensors. It should be note that the data store 104 may be communicatively connected to the RL engine 105, configuration generator 106, proximity function generation 107, and rendering engine 108.

The RL engine 105 may be an important part of the sensor configuration and validation device 101. The RL engine 105 may be communicatively interlinked between the data store 104 and the configuration generator 106. It should be noted that there may be a two-way communication between the data store 104 and RL engine 105. Moreover, an information may be transmitted or received by the RL engine 105. The RL engine 105 preferably employs a reinforcement learning (RL) model with the aim of identifying the appropriate set of IoT sensors. To the end, an output data of the IoT sensor may be verified while the IoT sensor is working in an operating mode. The verification may be done in order to check whether the IoT sensor working in a correct way or not. Additionally, the IoT sensor should meet the user requirement to be a part of the appropriate set of IoT sensors.

The verification may be done based on a predefined set of parameters like an operational range of the IoT sensor, or regional policies. When a plurality of sets of IoT sensors matches the user requirement, the physical proximity for operational range for each of the plurality of sets of IoT sensors in a workflow (where data needs to be exchanged) may be analysed. Further, the RL model may be trained or tested to determine the appropriate set of IoT sensors by rewarding or penalizing a plurality of sets of IoT sensors based on their respective performance scores. The training and testing may be executed by considering different type of anomalies in combination with each the IoT sensors of different vendor types.

In an example, consider a workflow where two user requirements are: to count a number of tablets in a bottle, and to count a number of ointment packets on a conveyor belt. So, the operational range for both the user requirements may be different based on a volume of production, stock, or season. For two different operational ranges, the RL engine 105 may provide a smooth switching between the two user requirements, either by selecting a new appropriate set of sensors or by reconfiguring the same set of appropriate sensors.

In the example discussed above, initially a set of IoT sensors counts the number of tablets in the bottles. After encountering a new user requirement, the same set of sensors counts the number of ointment packets rather than counting the tablets in the bottles. Since, there is a chance that the operating range of the set of IoT sensors may not match the new user requirement, the system 100 may need to identify the appropriate set of sensors to cope up with the new user requirement.

With regards to the appropriate set of sensors, the configuration generator 106 receives the appropriate set of sensors from the RL engine 105. Further, the configuration generator 106 may be communicatively coupled to the data store 104 and the proximity function generator 107. It should be noted that all the IoT sensors from different vendors may be connected to the system 100 for validation. It is obvious that each of the appropriate set of sensors may require a separate setup environment and a different configuration. The configured appropriate set of IoT sensors may be further processed by the proximity function generator 107.

The proximity function generator 107 requests each of the set of IoT sensors to enter the operating mode and generate the output data. Thereafter, the request may be framed based on the vendor type. Each of the appropriate set IoT sensors may be maintained in the operating mode for a threshold time (in minutes or hours). It should be noted that the threshold time may be different for each of the appropriate set of IoT sensors depending upon the vendor type. The output data of each of the appropriate set of IoT sensors may be used to generate a proximity function based on a spatial temporal two-dimension (2-D) time series and, accordingly, an anomaly detection may be performed by the proximity function generator 107.

There may be two possible outcomes of the proximity function generator 107. One of the outcomes may indicate that the IoT sensor may be working in a proper condition, whereas another outcome may indicate a faulty condition of the IoT sensor. Further, each of the set of appropriate sensors need to be validated for which a presence and a type of the anomaly may verified by performing a set of validation tests. Further the proximity function generator 107 may be operatively coupled to the rendering engine 108.

The rendering engine 108 propagates these outcomes in an effective way. Consequently, faulty IoT sensors may be eliminated from the system 100. In addition, the rendering engine 108 informs users for avoiding the faulty IoT sensors. As stated above, use of data from the faulty IoT sensor tends to introduce untoward or unexpected scenarios or situations. Further, the rendering engine 108 renders the recommendations of IoT sensor information to the users based on at least one of the vendor type, a region, a mode of operation, and a result of operation.

It should be noted that the sensor configuration and validation device 101 may be implemented in programmable hardware devices such as programmable gate arrays, programmable array logic, programmable logic devices, or the like. Alternatively, the sensor configuration and validation device 101 may be implemented in software for execution by various types of processors. An identified engine/module of executable code may, for instance, include one or more physical or logical blocks of computer instructions which may, for instance, be organized as an object, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for dynamically configuring and validating IoT sensors. For example, the exemplary system 100 and associated sensor configuration and validation device 101 may configure and validate IoT sensors using reinforcement learning, by the process discussed herein. In particular, as will be appreciated by those of ordinary skill in the art, control logic and/or automated routines for performing the techniques and steps described herein may be implemented by the system 100 and the associated sensor configuration and validation device 101 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system 100.

Figure 2:
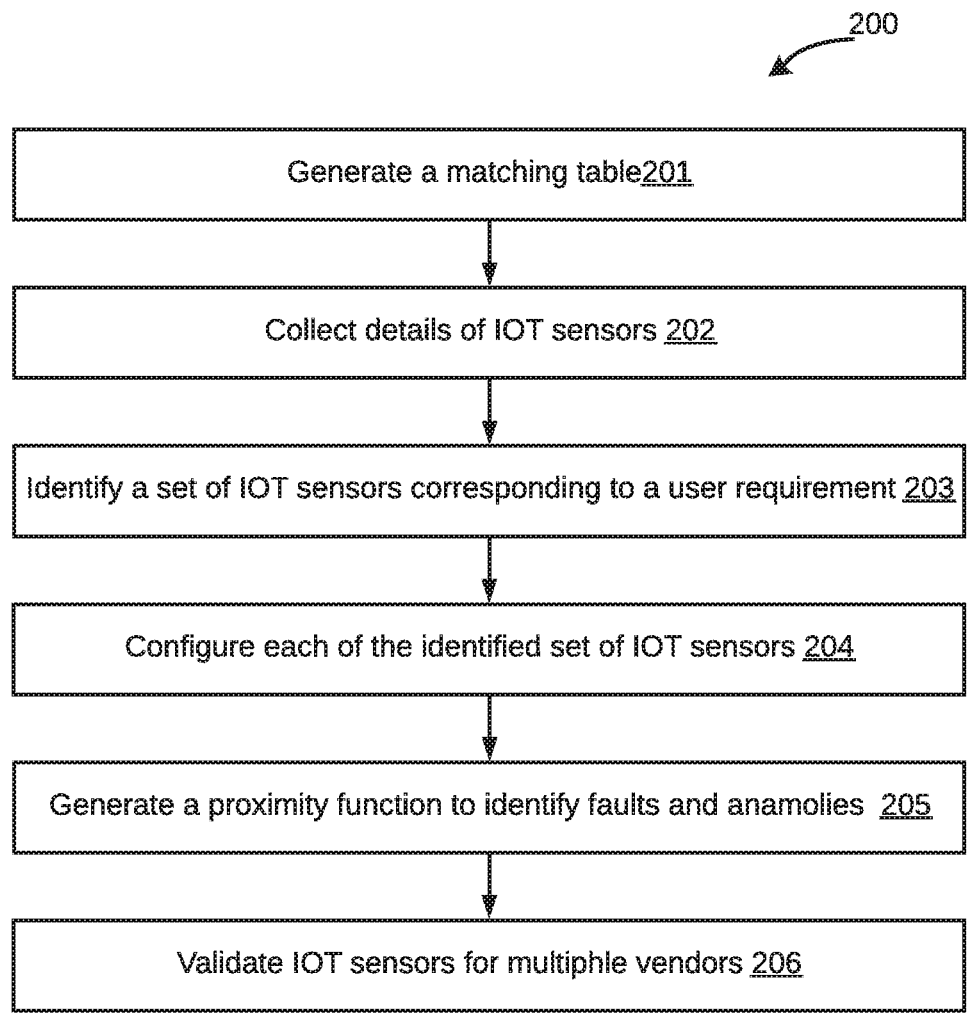
FIG. 2 is a flow diagram of an exemplary process overview for configuring and validating multi-vendor multi-region IoT sensors using reinforcement learning, in accordance with some embodiments of the present disclosure.

Referring now to FIG. 2, an exemplary process overview 200 for configuring and validating multi-vendor multi-region IoT sensors using reinforcement learning is depicted via a flowchart, in accordance with some embodiments of the present disclosure. All the steps of the process 200 may be performed by various modules/engines present within the sensor configuration and validation device 101 of system 100. At step 201, a matching table may be generated using a theme based iterative parsing. Further, a product data associated with an IoT sensor may be analyzed. In some embodiments, a plurality of sensor attributes associated with the IoT sensor may be extracted from the product data. For example, the plurality of sensor attributes may include a sensor capability, a sensor application and a sensor usage. The matching table may include output parameters of the IoT sensor, sensor units, sensor least count, an operation range of sensor, a sensor usage and its application. In one embodiment, a Universal plug and play (UPNP) protocol may be employed to read the sensor capability directly from the IoT sensor. However, the product data may typically be in a structured format and may further be used to generate the matching table. In another embodiment, an image of IoT sensor may be processed to get the product data associated with the IoT sensor. Additionally, in some embodiments, a user manual, brochures or a product web page of the IoT sensor may be accessed to fetch the product data.

In some embodiments, a natural language processing (NLP) technique may be employed to parse the product data and subsequently to extract the plurality of sensor attributes from the product data. Various iterations may be performed for the step 201, while extracting the plurality of sensor attributes. It should be noted that the NLP model gives specifications of IoT sensor. In some embodiments, the plurality of attributes may be converted to wh-question type as the size is relatively small. It should be noted that, a long short-term memory (LSTM) based wh-Q&A model may be built and subsequently employed to generate the plurality of sensor attributes associated with the IoT sensor. Further, output of LSTM Wh-Q&A model may be mapped with the plurality of sensor attributes to check whether two or more of the plurality of sensor attributes belong to a same wh-question type or not. Additionally, an attention LSTM based Q&A model may be built and employed for further improvement in mapping.

At step 202, details of IoT sensor including an identification information and an operational information associated with the IoT sensor and a set of neighboring IoT sensors may be collected. By way of an example, for selecting IoT sensor, a minimum distance between the nearby IoT sensors based on GPS co-ordinates may be determined. In another example, 'n' best performing nearby IoT sensors within a pre-defined range of proximity may be identified. The pre-defined range of the proximity may be changed according to a change in user requirement. It should be noted that the nearby sensors for the IoT sensor may belong to a same vendor type or different vendor type. The collected details associated with the IoT sensor and the set of neighboring IoT sensors may be further stored in the data store 104. Also, the details of the IoT sensor may be retrieved according to the user requirement by some of the modules/engines of the system 100.

At step 203, an appropriate set of sensors IoT sensors may be identified corresponding to the user requirement. It should be noted that, in some embodiments, output data of each of the appropriate set of sensors may be verified by keeping the each of the appropriate set sensors in operating mode. The verification may be performed for checking whether the sensors are working correctly or not. For identifying the appropriate set of IoT sensors, each of the appropriate set of IoT sensors should meet the user requirement. The IoT sensor may be selected based on sensor parameters, the operational range, and regional policies. In case two or more sets of IoT sensors meet the user requirement, then their physical proximity for operational range with similar sets of IoT sensors as well as other sets of IoT sensors in a workflow (where data needs to be exchanged) may be evaluated.

In an example, consider 'M' number of IoT sensors that are available in a system (such as the system 100) to monitor a conveyer belt. Out of the 'M' number of IoT sensors, an 'N' number of IoT sensors (say, $N_1, N_2, N_3 \ldots N_n$) are used to count something. It should be noted that either the 'N' number of IoT sensors belong to the same vendor type or the different vendor type. The RL model of the RL engine 105 (explained in conjunction with the system 100 of FIG. 1) may identify the appropriate set of IoT sensors. Here, the appropriate set of sensors may be a winning set of sensors that scores T. There are total $[M \times (N_1 \times N_2 \times \ldots \times N_n)]$ possible sets of sensors that match the user requirement. However, due to the IoT sensor configuration, setup, location, specifications and limitations, only a few sets of IoT sensors may match the user requirement. Also, a single appropriate set of IoT sensors may reflect an optimum match to the user requirement (i.e., may satisfy a maximum number of constraints).

In some embodiments, each of the sets of IoT sensors that are matching the user requirement may be awarded with a score based on a performance analysis. The performance analysis may be performed by calculating weighed average of multiple factors like a distance among the sets of sensors, a time of task completion, a bandwidth required along the workflow, and a support for protocol range. Each of the sets of IoT sensors may compete against other sets of IoT sensors based on their performance scores. A set of IoT sensors with a highest performance score may be rewarded with the maximum rewards and a set of IoT sensors with the lowest performance score may be penalized the most. Hence, a suitable fraction of performance score forms the right reward for each of the sets of sensors.

When, $C_1, C_2, C_3 \ldots C_n$ are the sets of IoT sensors and each of the sets of IoT sensors is matching the user requirement, a performance score corresponding to each of the sets of IoT sensors may be identified as $P_1, P_2, \ldots P_n$, respectively. A formula for determining a performance score of each of the set of IoT sensors may be as per equation (1) below:

$$P_i = w_1*(\text{distance measure among the neighbors}) + w_2*(\text{how much it supports the communication protocol range}) + w_3 (\text{sensor devices belong to how many vendor types, the more the vendor types, less the score}) + \ldots \text{and so on} \qquad (1)$$

For example, consider that a performance score $P_{10}$ corresponding to the set of IoT sensors $C_{10}$ has the highest performance score (i.e. '1'), therefore the next highest performance score for another set of IoT sensors may be rewarded with a factor of $(1-1/n)$, the successive highest performance score may be rewarded with $(1-2/n)$, and so on. A formula for calculating reward may be as per equation (2) below:

$$R=1, \text{ for best performer, and}$$

$$R=1-(i/n) \qquad (2)$$

where, a range of 'i' lies from 2 to 'n', and 'n' denotes a total number of combinations matching the user requirement Additionally, the output data of each of the appropriate set of IoT sensors may be verified. As discussed above, there may be two possible outcomes. When the IoT sensor operate in an appropriate manner or the output of the IoT sensor reflects satisfactory working, the sensor may be awarded with positive number, i.e., '+r' by the RL model. Contrary to the first possible outcome a second possible outcome reflects inappropriate working of the IoT sensor. In such case, the IoT sensor may be punished with a negative number '-r' by the RL model. As the time elapses, the RL model rewards and punishes each of the appropriate set of IoT sensors, according to a presence and a type of anomaly. The verification of the presence of anomaly and the type of anomaly may depend on time series output data from a set of neighboring IoT sensors from the appropriate set of IoT sensors, while the IoT sensor is working in the operating mode.

When two IoT sensors of the set of IoT sensors work appropriately, then for each time period (equivalent to the threshold time), the reward may be incremented by r and may become '+2r'. In a similar way, two inappropriately working IoT sensors may contribute '−2r' penalty to the set of IoT sensors. Thus, the RL engine 105 learns by rewarding and punishing results with respect to the faulty or working behavior of the IoT sensors in each of the plurality of set of IoT sensors. As discussed, the behavior of IoT sensor may be based on vendor type, configurations, settings and external factors if any. Hence, the set IoT sensors with a greater number of faulty IoT sensors may get maximum punishment.

Additionally, different configurations required by the IoT sensors, which may be dependent on the vendor type and a platform, a security standard, a network, a data protocol and business standard, may be also learnt by the RL model.

When a configuration setting of the IoT sensor does not belong to its vendor type, then the RL model is punished, otherwise the RL model is rewarded. In other words, the RL model may be trained for all right and wrong configurations of the IoT sensors of each vendor type. The training of the RL model may be executed in multiple epochs so that the RL model is trained for all combinations of configurations, regions settings, and regulations.

At step 204, each of the identified appropriate set of IoT sensors may be configured. It should be noted that each of the appropriate set of IoT sensors requires different setup environment and configuration to be performed. Initially, the IoT sensor may be in an inactive state, so a state variable may be set to "INACTIVE". Thereafter, a turn on request may be sent to each of the appropriate set of IoT sensors based on the vendor type. Once each of the IoT sensors receives the turn on request, they may be powered ON and may enter an "ACTIVE" state. A response corresponding to the "ACTIVE" state may be sent to a respective gateway.

Now, the gateway may send an initialization request to each of the appropriate set of IoT sensors. The IoT sensors may use initialization parameters to enter a "START" state and may accordingly send a final response to the respective gateway. The gateway now transmits a configuration request along with configuration parameters to the IoT sensors. It should be noted that the configuration request may be different for different IoT sensors depending on the vendor type and a test that needs to be validated. For example, when a set of temperature sensors need to be validated, then the configurations may be based on a normal temperature, a below normal temperature, an above normal temperature, an abnormal or any combination of these.

At step 205, a proximity function may be generated to detect faults and anomalies. The IoT sensors may send a request to the gateway in order to enter an operating mode and to generate an output data accordingly. For example, the configuration request may be sent to the IoT sensors to work in normal temperature. Then, a record temperature request may be used to validate operations of the IoT sensors in normal mode. The request may be framed based on the vendor type and device specific parameters. The IoT sensors may perform the configuration when any 'r' record temperature request is encountered and may finally enter a "WORKING" state. The IoT sensors may be maintained in the operating mode for the threshold time (minutes or hours) and may be analyzed based on the vendor type. It may be either the weighted average of threshold values of all vendors or the maximum threshold values of all vendor types.

The output data collected during the threshold time is time series data, which may be further fed to a Long Short-Term Memory (LSTM) model or Auto Regressive integrated Moving Average (ARIMA) model to detect anomalies. The operational information may be fetched, and a suitable method may be employed for validation. The anomaly type may comprise a temporary anomaly, a malicious anomaly, a fake anomaly, or a permanent anomaly. An output of the LSTM or the ARIMA model may be monitored over a period to detect the type of anomaly. Once the anomaly is detected; it may be verified for confirmation.

When the detected anomaly is the temporary anomaly, then proximity sensors may be picked from a proximity list and one of a K-nearest neighbors approach or a maximum voting approach may be employed to confirm the presence of anomaly. A Convolution Neural Network (CNN) may be trained so that it takes the time series data of the IoT sensors and classifies them. The values of IoT sensors over the timeline in minutes may form the time series data. For example, a matrix of '784' values (28×28) may be taken over continuous timeline for each of the IoT sensors and then normalized before feeding it to the CNN. The CNN may be trained with a plurality of such values for all IoT sensors during an evaluation of an input of the IoT sensor. An LSTM or another CNN may be trained with anomaly inputs to classify them according to their anomaly type. The CNN may take a heat map of an anomaly data for the IoT sensors belonging to each vendor type and may classify them.

In some embodiments, the K-nearest neighbors approach may be employed. In the K-nearest neighbors approach, the output data of the IoT sensor may be verified with K-nearest IoT sensors. The distance among the IoT sensors may be measured using a location coordinates, i.e., Location (x, y), for each two of the IoT sensors. The absolute value may be determined by calculating a difference between Location (x, y) values. This may be a yardstick to measure the distance from 'K' neighbors with minimum absolute value that may be considered for verification purpose. Output values of these 'K' nearest neighbors may be compared to check whether the anomaly is present or not. In case, the IoT sensor is found to be faulty, then its state is marked as FAULTY.

In some embodiments, the maximum voting approach may be employed. In this approach, the proximity sensor may indicate a faulty condition of the IoT sensor based on a comparison between outputs. When the proximity sensor indicates that the IoT sensor is faulty, then a '1' vote is counted for a faulty team. Similarly, a '1' vote may be counted for a non-faulty team, in case of IoT sensor is not faulty. Once votes from all the proximity sensors are obtained, then whichever team gets maximum votes may indicate the condition of the IoT sensor. When the Faulty team gets highest votes, then the IoT sensor is consider as faulty otherwise not.

At step 206, the IoT sensor may be validated for multiple vendors. Further, the detected faulty IoT sensors may be removed from the system 100. The users may be recommended to avoid the faulty IoT sensors as the use of faulty sensors may end up giving wrong results and, therefore, causing untoward or unexpected scenarios or situations. The results may be elaborate and may be provided in a hierarchical manner based on the vendor type, region, mode of operation and results of operation. With the results, the vendor may be able to analyze various details of IoT sensors and their working, and accordingly takes decisions.

Figure 3:
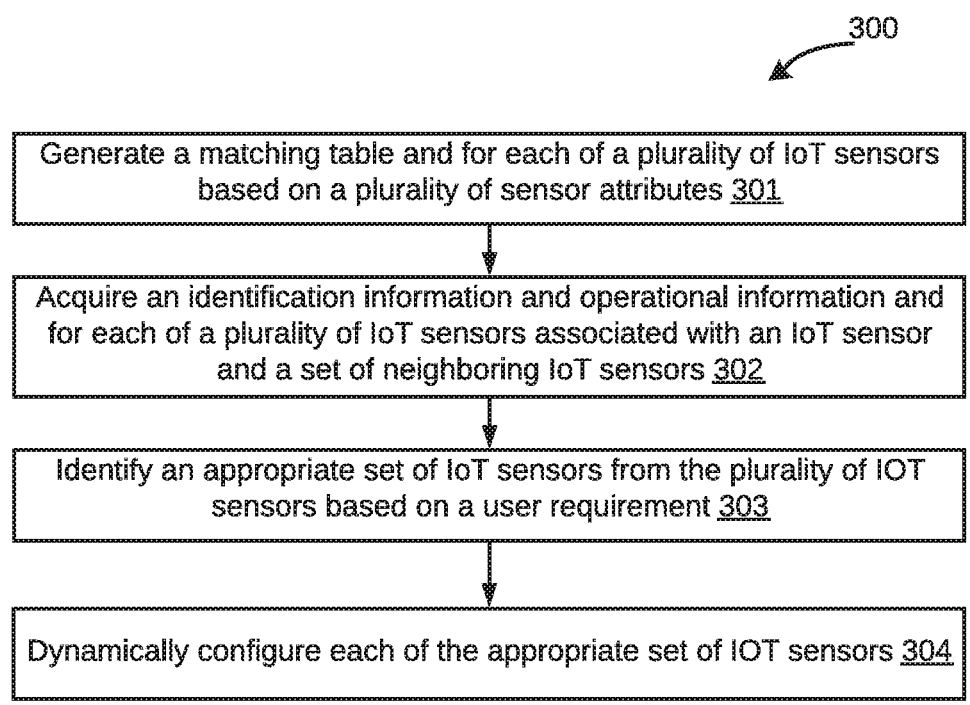
FIG. 3 is a flow diagram of an exemplary process for configuring multi-vendor multi-region IoT sensors using reinforcement learning, in accordance with some embodiments of the present disclosure.

Referring now to FIG. 3, an exemplary process 300 for configuring multi-vendor multi-region IoT sensors using reinforcement learning is depicted via a flowchart, in accordance with some embodiments of the present disclosure. At step 301, a matching table may be generated for each of a plurality of IoT sensors by a sensor configuration and validation device 101. The matching table may be generated based a plurality of sensor attributes extracted from a product data associated with an IoT sensor. In some embodiments, the product data may be fetched from at least one of IoT sensors, an image of the IoT sensor, a product document associated with the sensor. Additionally, in such embodiments, the plurality of sensor attributes may be extracted by employing at least one of a Natural Language Processing (NLP) model, and an Artificial Neural Network (ANN) model. Thereafter, in some embodiments, the matching table may be stored in the data store 104. It should be noted that the plurality of sensor attributes may include at least one of a sensor capability, a sensor usage, and a sensor application.

Further at step 302, an identification information and an operational information may be acquired for each of the plurality of IoT sensors associated with the IoT sensor and a set of neighboring IoT sensors, by the sensor configuration and validation device 101. Thereafter, in some embodiments, the identification information and operational information may be stored in the data store 104. It should be noted that the identification information may include a unique identification number, a vendor identification, or a vendor make information. Further, it should be noted that the operational information may include a gateway IP address, a physical location, a current state, a voting information, or a working mode. In some embodiments, the set of neighboring IoT sensors may be determined based on the physical location and the vendor type for each of the plurality of IoT sensors.

At step 303, an appropriate set of IoT sensors may be identified from the plurality of IoT sensors, by the sensor configuration and validation device 101. The appropriate set of IoT sensors may be identified based on a user requirement, the matching table, the identification information and the operational information. Further, a Reinforcement Learning (RL) model may be employed to identify the appropriate set of IoT sensors. It should be noted that the RL model may be trained to determine the appropriate set of IoT sensors by rewarding or penalizing a plurality of sets of IoT sensors based on their respective performance scores.

In some embodiments, the plurality of sets of IoT sensors that match the user requirement may be identified based on the matching table, the identification information, and the operational information. Additionally, in such embodiments, a performance score for each of the plurality of sets of IoT sensors may be generated based on respective performance parameters. It should be noted that the performance parameters may include at least one of a distance among the set neighboring IoT sensors, a time, a bandwidth, a constraint, a variance in the vendor type, and a support for protocol range. Additionally, in such embodiments, a reward and a penalty may be assigned to each of the plurality of sets of IoT sensors based on their respective performance score.

At step 304, each of the appropriate set of IoT sensors may be configured dynamically based on a vendor type, by the sensor configuration and validation device 101. In some embodiments, a subset of the appropriate set of IoT sensors may be initialized based on the vendor type using a plurality of initialization parameters. Thereafter, the subset of the appropriate set of IoT sensors may be configured using a set of configuration parameters for a set of validation tests to be performed.

Further in some embodiments, the process 300 may provide for validating the multi-vendor multi-region IoT sensors. In particular, in such embodiments, a threshold time may be determined to maintain the IoT sensor in an operating mode based on the vendor type. Additionally, a time series output data may be acquired from the IoT sensor while the IoT sensor is working in the operating mode. Further, a presence and a type of an anomaly may be detected based on the time series output data. In some embodiments, a statistical model or an artificial neural network (ANN) model may be employed to detect the presence and the type of the anomaly. The type of anomaly may include one of a temporary anomaly, a malicious anomaly, a fake anomaly, or a permanent anomaly.

In some embodiments, the presence and the type of the anomaly may be verified based on time series output data from a set of neighboring IoT sensors from the appropriate set of IoT sensors while the IoT sensor is working in the operating mode. In such embodiments, the verification may also be performed by employing the ANN model. Further, in some embodiments, each of the set of appropriate sensors, for which the presence and the type of the anomaly is verified, may be validated by performing a set of validation tests. In some embodiments, a result of the validation may be rendered to the user based on at least one of the vendor type, a region, a mode of operation, and a result of operation.

By way of an example, an owner of a group of hospitals whose name may be 'Smith' may want to procure IoT sensor devices for multiple purposes such as for temperature sensing, theft handling, and for medical devices. 'Smith' may receive various proposals from different companies, and finally accepts a proposal of a company for which 'John' is responsible. 'John' may find a problem that the IoT sensor devices that support the customer requirement objectives may not belong to a single vendor type. Therefore, 'John' may need to buy the IoT sensor devices from different vendors and must validate the IoT sensor devices before delivering to 'Smith'. 'John' may require a suitable test bed which supports validation of IoT sensor devices belonging to different vendors, multiple regions, and regulations. In such case, the system described in the present disclosure may help john to validate the IoT sensor devices manufactured by multiple vendors, supporting multiple regions and regulations.

In an example, consider a place/room assuming there are two temperature sensors, from two different vendors. One of the temperature sensors may display '−20° C.' and other may display '+20° C.'. When '+20° C.' is the correct value, then the system 100 discussed in present disclosure may rightly predict that the '+20° C.' is an accurate value and provides the recommendations indicating that '−20° C.' is to be replaced immediately. Similarly, for any type of sensors like a humidity sensor, a light sensor, or a movement sensor, the nearby sensors may be analyzed by the present system before deciding a correct value to be used or captured.

Consider a situation, when an insect like cockroach, lizard, or a spider are obstructing the IoT sensors while capturing values. In such case, the present disclosure provides a solution. The system 100 may identify that something is blocking the IoT sensor, immediately by monitoring. The system 100 may then notify the user that a value captured by the IoT sensor may not be an accurate value. Therefore, the system 100 may recapture the value once insect moves away or capture the value from next immediate sensors available. The system may, therefore, identify obstruction or blocking immediately and may send a signal to a nearest gateway or cloud where the IoT sensor data may be sent. The system 100 may also store these incorrect values for further measurement and learning.

The present disclosure provides many advantages such as a seamless use of IoT devices accepting geographical changes, dynamic configuration of the IoT devices, distinction of faults and intermittent anomaly. The disclosed method and system work for multiple regions by adapting a change dynamically based on the GPS location. In addition, the method supports multiple-vendor IoT devices, independent of their configurations respective to their platform, network, data protocol, security standard and business standards. Also, the method offers the advantage of detecting the type of fault including an un-natural fault, a permanent fault, and a temporary fault, generally not focus by the vendors. The method provides not only the fault type when the sensor is faulty, but also more details like a frequency of fault, a time stamp on the test execution timeline, and some external factors influencing the fault.

Figure 4:
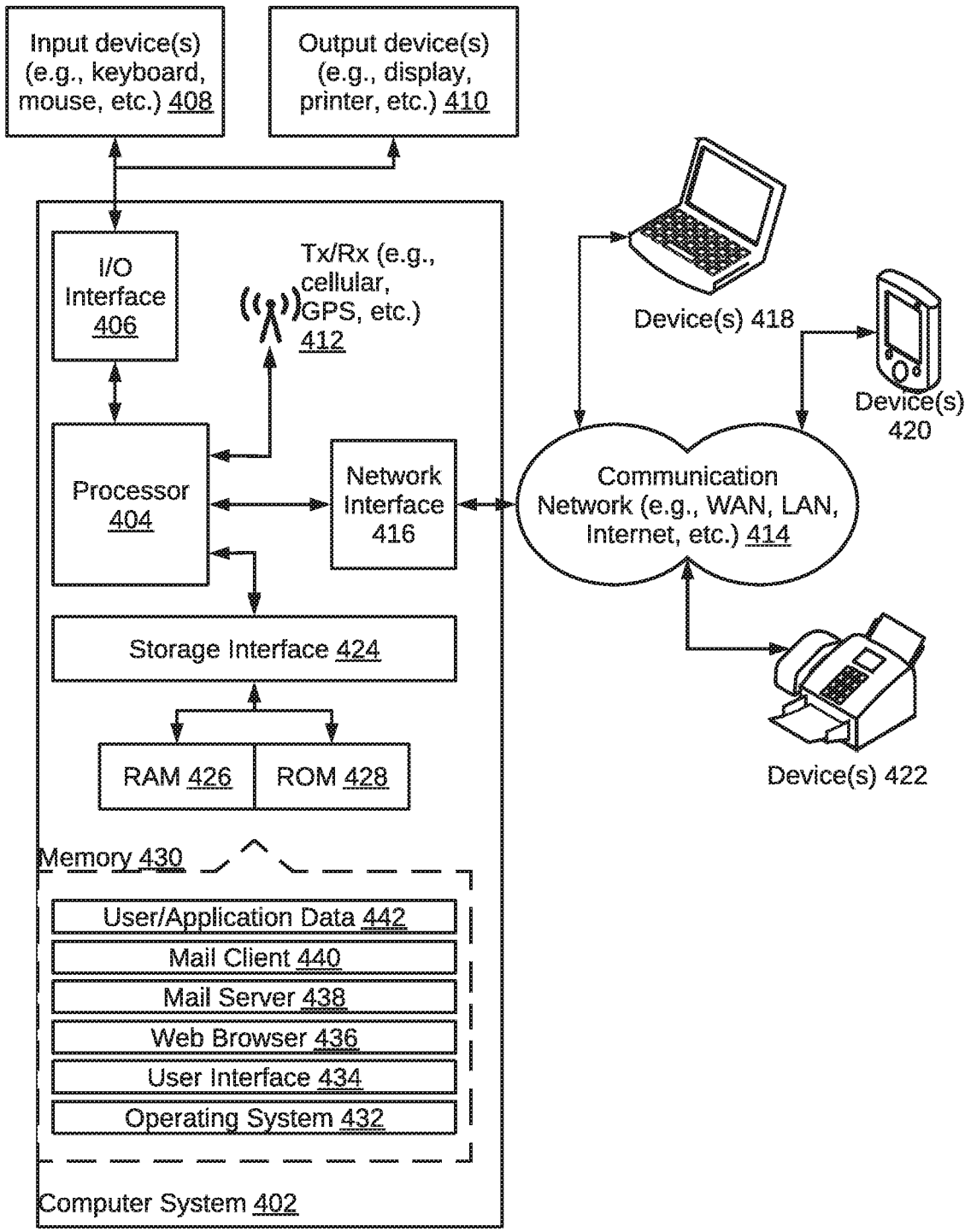
FIG. 4 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 4, a block diagram of an exemplary computer system 402 for implementing various embodiments is illustrated. Computer system 402 may include a central processing unit ("CPU" or "processor") 404. Processor 404 may include at least one data processor for executing program components for executing user-generated or system-generated requests. A user may include a person, a person using a device such as such as those included in this disclosure, or such a device itself. Processor 404 may include specialized processing units such as integrated system (bus) controllers, memory management control units, floating point units, graphics processing units, digital signal processing units, etc. Processor 404 may include a microprocessor, such as AMD® ATHLON® microprocessor, DURON® microprocessor or OPTERON® microprocessor, ARM's application, embedded or secure processors, IBM® POWERPC®, INTEL'S CORE® processor, ITANIUM® processor, XEON® processor, CELERON® processor or other line of processors, etc. Processor 404 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 404 may be disposed in communication with one or more input/output (I/O) devices via an I/O interface 407. I/O interface 407 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 406, computer system 402 may communicate with one or more I/O devices. For example, an input device 408 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 410 may be a printer, fax machine, video display (for example, cathode ray tube (CRT), liquid crystal display (LCD), light-emitting diode (LED), plasma, or the like), audio speaker, etc. In some embodiments, a transceiver 412 may be disposed in connection with processor 404. Transceiver 412 may facilitate various types of wireless transmission or reception. For example, transceiver 412 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 418-PMB9800® transceiver, or the like), providing IEEE 802.11 a/b/g/n, Bluetooth, FM, global positioning system (GPS), 2G/3G HSDPA/HSUPA communications, etc.

In some embodiments, processor 404 may be disposed in communication with a communication network 414 via a network interface 416. Network interface 416 may communicate with communication network 414. Network interface 416 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 414 may include, without limitation, a direct interconnection, local area network (LAN), wide area network (WAN), wireless network (for example, using Wireless Application Protocol), the Internet, etc. Using network interface 416 and communication network 414, computer system 402 may communicate with devices 418, 420, and 422. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 402 may itself embody one or more of these devices.

In some embodiments, processor 404 may be disposed in communication with one or more memory devices (for example, RAM 426, ROM 428, etc.) via a storage interface 424. Storage interface 424 may connect to memory 430 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 430 may store a collection of program or data store 104 components, including, without limitation, an operating system 432, user interface application 434, web browser 436, mail server 438, mail client 440, user/application data 442 (for example, any data variables or data records discussed in this disclosure), etc. Operating system 432 may facilitate resource management and operation of computer system 402. Examples of operating systems 432 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 434 may facilitate display, execution, interaction, manipulation, or operation of program components through textual or graphical facilities. For example, user interfaces may provide computer interaction interface elements on a display system operatively connected to computer system 402, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 402 may implement a web browser 436 stored program component. Web browser 436 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 402 may implement a mail server 438 stored program component. Mail server 438 may be an Internet mail server such as MICROSOFT® EXCHANGE® mail server, or the like. Mail server 438 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 438 may utilize communication protocols such as internet message access protocol (IMAP), messaging application programming interface (MAPI), Microsoft Exchange, post office protocol (POP), simple mail transfer protocol (SMTP), or the like. In some embodiments, computer system 402 may implement a mail client 440 stored program component. Mail client 440 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 402 may store user/application data 442, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The techniques described in various embodiments discussed above provide for dynamic configuration and validation of IoT sensors belonging to multiple vendors and deployed in various regions via a single platform. Further, the techniques described above may employ any kind of deep neural network (DNN) such as recurrent neural network (RNN), convolutional neural network (CNN), or the like. Moreover, the techniques may be easily deployed in any cloud-based servers for access and use as a 'platform as a service' by any computing device including mobile device. For example, the sensor configuration and validation device 101 may be implemented on a cloud-based server and used for dynamically configuring and validating IoT sensors.

The specification has described method and system validating multi-vendor internet-of things devices using reinforcement learning. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for dynamically configuring Internet-of-Things (IoT) sensors using reinforcement learning, the method comprising:

generating, by a sensor configuration and validation device and for each of a plurality of IoT sensors, a matching table based on a plurality of sensor attributes extracted from a product data associated with an IoT sensor;

acquiring, by the sensor configuration and validation device and for each of the plurality of IoT sensors, an identification information and an operational information associated with the IoT sensor and a set of neighboring IoT sensors;

identifying, by the sensor configuration and validation device, an appropriate set of IoT sensors from the plurality of IoT sensors, based on a user requirement, the matching table, the identification information and the operational information, using a Reinforcement Learning (RL) model, wherein the RL model is trained to determine the appropriate set of IoT sensors by rewarding or penalizing a plurality of sets of IoT sensors based on their respective performance scores;

determining, for each of the appropriate set of IoT sensors, a threshold time to maintain the IoT sensor in an operating mode based on a vendor type;

acquiring a time series output data from the IoT sensor while the IoT sensor is working in the operating mode;

detecting, by the sensor configuration and validation device, a presence and a type of an anomaly based on the time series output data using one of a statistical model or an artificial neural network (ANN) model, wherein the type of the anomaly comprises one of a temporary anomaly, a malicious anomaly, a fake anomaly, or a permanent anomaly;

verifying, by the sensor configuration and validation device, the presence and the type of the anomaly, based on time series output data from the set of neighboring IoT sensors from the appropriate set of IoT sensors while the IoT sensor is working in the operating mode, using the ANN model;

validating, by the sensor configuration and validation device, each of the set of appropriate sensors for which the presence and the type of the anomaly is verified by performing a set of validation tests;

rendering, by the sensor configuration and validation device, a result of the validation based on at least one of a vendor type, a region, a mode of operation, and a result of operation; and dynamically configuring, by the sensor configuration and validation device, each of the appropriate set of IoT sensors based on the vendor type.

2. The method of claim 1, wherein generating the matching table further comprises:

fetching the product data from at least one of sensors, an image of the sensor, a product document associated with the sensor; and extracting the plurality of sensor attributes from the product data by employing at least one of a Natural Language Processing (NLP) model, and the Artificial Neural Network (ANN) model.

3. The method of claim 1, wherein:

the plurality of sensor attributes comprises at least one of a sensor capability, a sensor usage, and a sensor application;

the identification information comprises a unique identification number, a vendor identification, or a vendor make information; and the operational information comprises a gateway IP address, a physical location, a current state, a voting information, or a working mode.

4. The method of claim 1, wherein the set of neighboring IoT sensors are determined based on the physical location and the vendor type for each of the plurality of IoT sensors.

5. The method of claim 1, wherein identifying the appropriate set of IoT sensors comprises:

identifying the plurality of sets of IoT sensors that match the user requirement based on the matching table, the identification information, and the operational information;

generating a performance score for each of the plurality of sets of IoT sensors based on the respective performance parameters, wherein the performance parameters comprise at least one of a distance among the set neighboring IoT sensors, a time taken for task completion, a bandwidth, a constraint, a variance in the vendor type, and a support for protocol range; and assigning a reward and a penalty to each of the plurality of sets of IoT sensors based on their respective performance score.

6. The method of claim 1, wherein dynamically configuring further comprises:

initializing a subset of the appropriate set of IoT sensors based on the vendor type using a plurality of initialization parameters; and configuring the subset of the appropriate set of IoT sensors using a set of configuration parameters for a set of validation tests to be performed.

7. A system for dynamically configuring Internet-of-Things (IoT) sensors using reinforcement learning, the system comprising:

a processor; and a memory communicatively coupled to the processor, wherein the memory stores processor-executable instructions, which, on execution, causes the processor to:

generate a matching table for each of a plurality of IoT sensors based on a plurality of sensor attributes extracted from a product data associated with an IoT sensor;

acquire an identification information and an operational information for each of the plurality of IoT sensors associated with the IoT sensor and a set of neighboring IoT sensors;

identify an appropriate set of IoT sensors from the plurality of IoT sensors, based on a user requirement, the matching table, the identification information and the operational information, using a Reinforcement Learning (RL) model, wherein the RL model is trained to determine the appropriate set of IoT sensors by rewarding or penalizing a plurality of sets of IoT sensors based on their respective performance scores;

determine, for each of the appropriate set of IoT sensors, a threshold time to maintain the IoT sensor in an operating mode based on a vendor type;

acquire time series output data from the IoT sensor while the IoT sensor is working in the operating mode;

detect a presence and a type of an anomaly based on the time series output data using one of a statistical model or an artificial neural network (ANN) model, wherein the type of the anomaly comprises one of a temporary anomaly, a malicious anomaly, a fake anomaly, or a permanent anomaly;

verify the presence and the type of the anomaly, based on time series output data from the set of neighboring IoT sensors from the appropriate set of IoT sensors while the IoT sensor is working in the operating mode, using the ANN model;

validate each of the set of appropriate sensors for which the presence and the type of the anomaly is verified by performing a set of validation tests;

render a result of the validation based on at least one of a vendor type, a region, a mode of operation, and a result of operation; and dynamically configure each of the appropriate set of IoT sensors based on the vendor type.

8. The system of claim 7, wherein the processor generates the matching table by:

fetching the product data from at least one of the sensors, an image of the sensor, a product document associated with the sensor; and extracting the plurality of sensor attributes from the product data by employing at least one of a Natural Language Processing (NLP) model, and the Artificial Neural Network (ANN) model.

9. The system of claim 7, wherein:

the plurality of sensor attributes comprises at least one of a sensor capability, a sensor usage, and a sensor application;

the identification information comprises a unique identification number, a vendor identification, or a vendor make information; and the operational information comprises a gateway IP address, a physical location, a current state, a voting information, or a working mode.

10. The system of claim 7, wherein the set of neighboring IoT sensors are determined based on the physical location and the vendor type for each of the plurality of IoT sensors.

11. The system of claim 7, wherein the processor identifies the appropriate set of IoT sensors by:

identifying the plurality of sets of IoT sensors that match the user requirement based on the matching table, the identification information, and the operational information;

generating a performance score for each of the plurality of sets of IoT sensors based on respective performance parameters, wherein the performance parameters comprise at least one of a distance among the set neighboring IoT sensors, a time taken for task completion, a bandwidth, a constraint, a variance in the vendor type, and a support for protocol range; and assigning a reward and a penalty to each of the plurality of sets of IoT sensors based on their respective performance score.

12. The system of claim 7, wherein the processor dynamically configures by:

initializing a subset of the appropriate set of IoT sensors based on the vendor type using a plurality of initialization parameters; and configuring the subset of the appropriate set of IoT sensors using a set of configuration parameters for a set of validation tests to be performed.

13. A non-transitory computer-readable medium storing computer-executable instructions for:

generating a matching table for each of a plurality of IoT sensors, based on a plurality of sensor attributes extracted from a product data associated with an IoT sensor;

acquiring an identification information and an operational information for each of the plurality of IoT sensors associated with the IoT sensor and a set of neighboring IoT sensors;

identifying an appropriate set of IoT sensors from the plurality of IoT sensors, based on a user requirement, the matching table, the identification information and the operational information, using a Reinforcement Learning (RL) model, wherein the RL model is trained to determine the appropriate set of IoT sensors by rewarding or penalizing a plurality of sets of IoT sensors based on their respective performance scores;

determining, for each of the appropriate set of IoT sensors, a threshold time to maintain the IoT sensor in an operating mode based on a vendor type;

acquiring a time series output data from the IoT sensor while the IoT sensor is working in the operating mode;

detecting a presence and a type of an anomaly based on the time series output data using one of a statistical model or an artificial neural network (ANN) model, wherein the type of the anomaly comprises one of a temporary anomaly, a malicious anomaly, a fake anomaly, or a permanent anomaly;

verifying the presence and the type of the anomaly, based on time series output data from the set of neighboring IoT sensors from the appropriate set of IoT sensors while the IoT sensor is working in the operating mode, using the ANN model;

validating each of the set of appropriate sensors for which the presence and the type of the anomaly is verified by performing a set of validation tests;

rendering a result of the validation based on at least one of a vendor type, a region, a mode of operation, and a result of operation; and dynamically configuring each of the appropriate set of IoT sensors based on the vendor type.

* * * * *